United States Patent [19]

Witte

[11] Patent Number: 4,625,314
[45] Date of Patent: Nov. 25, 1986

[54] METHOD FOR THE RECOGNITION OF THE OUTAGE OF ONE OR MORE TRANSMISSION CHANNELS IN A REDUNDANTLY DESIGNED OPTICAL TRANSMISSION SYSTEM

[75] Inventor: Hans-Hermann Witte, Munich, Fed. Rep. of Germany

[73] Assignee: Siemens Aktiengesellschaft, Berlin & Munich, Fed. Rep. of Germany

[21] Appl. No.: 617,548

[22] Filed: Jun. 5, 1984

[30] Foreign Application Priority Data

Sep. 28, 1983 [DE] Fed. Rep. of Germany ....... 3335156

[51] Int. Cl.$^4$ ........................................... G06F 11/16
[52] U.S. Cl. ......................................... 371/68; 371/36
[58] Field of Search .................. 371/68, 1, 61, 66, 36; 375/118, 107, 114, 110, 10

[56] References Cited

U.S. PATENT DOCUMENTS

| | | | |
|---|---|---|---|
| 4,122,995 | 10/1978 | Franke | 371/68 |
| 4,456,997 | 6/1984 | Spitza | 371/68 |
| 4,497,059 | 1/1985 | Smith | 371/68 |
| 4,499,584 | 2/1985 | Howarth | 371/68 |
| 4,520,483 | 5/1985 | Arita | 371/68 |
| 4,532,630 | 7/1985 | Corncy | 371/68 |

*Primary Examiner*—Michael R. Fleming
*Attorney, Agent, or Firm*—Hill, Van Santen, Steadman & Simpson

[57] ABSTRACT

A method and outage recognition device for use with a redundantly designed optical transmission system having at least two receiver circuits at each station of the system with each receiver circuit having an input, an output and a separate transmission channel connected to the input characterized by the recognition device and method determining an outage of either one of the transmission channels by applying an output of each of the receiver circuits to a means for recognizing outages in the channel and determining the outage in the transmission channel by the occurrent data independent of statistical phase positions of the data in each channel. In a specific embodiment of the device, various logic elements are interconnected in a manner so that they not only reliably identify an outage of a channel but also indicate which channel has failed.

8 Claims, 5 Drawing Figures

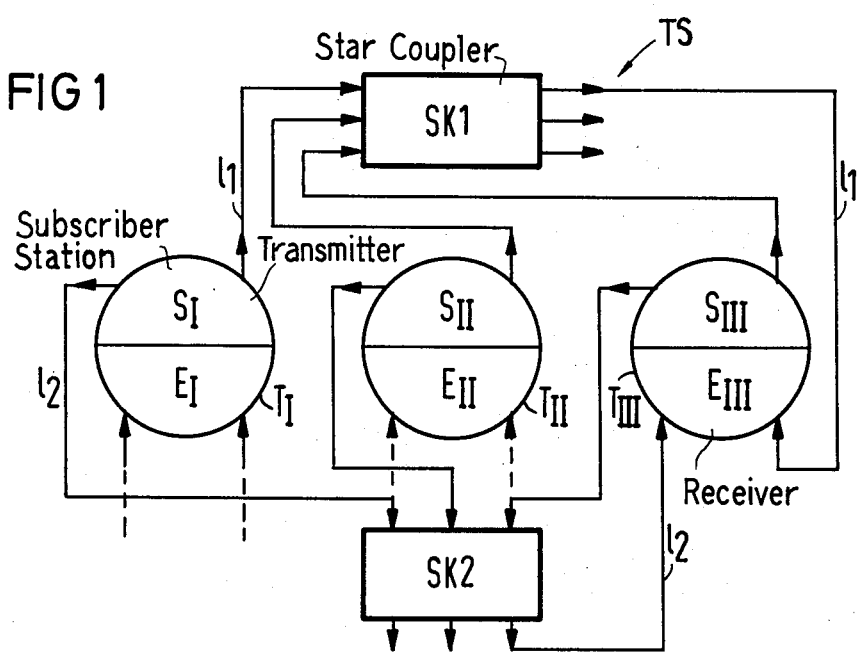
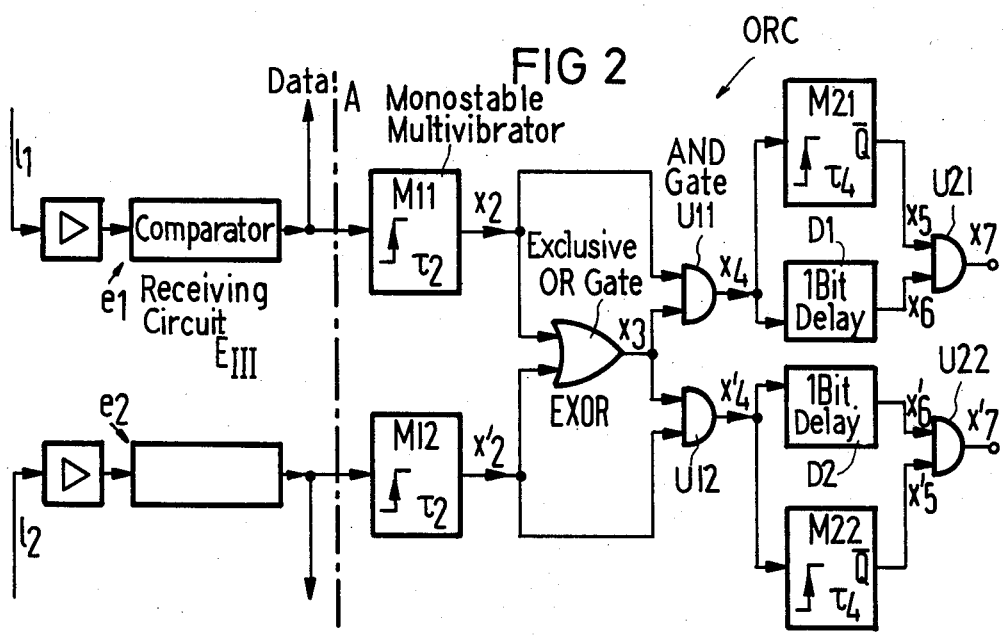

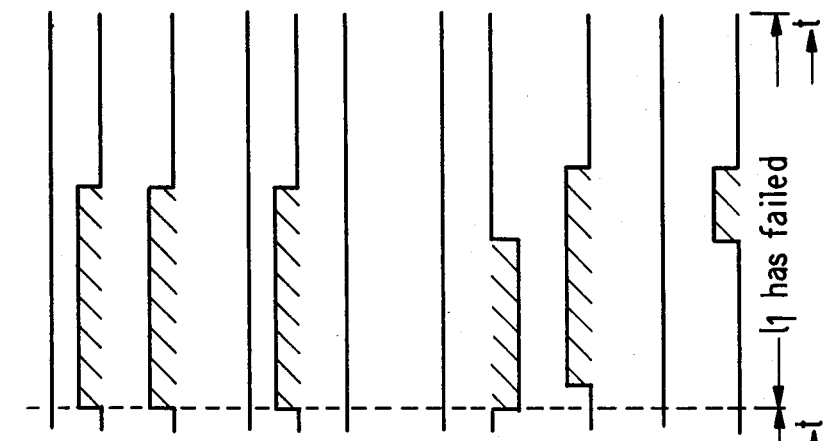
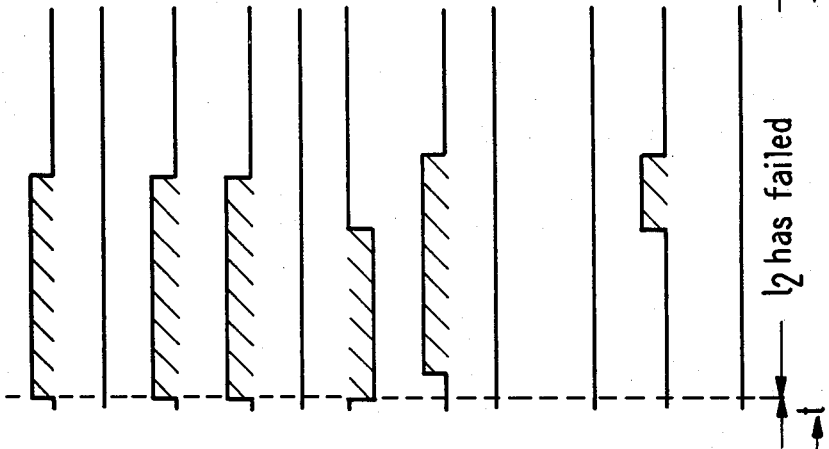
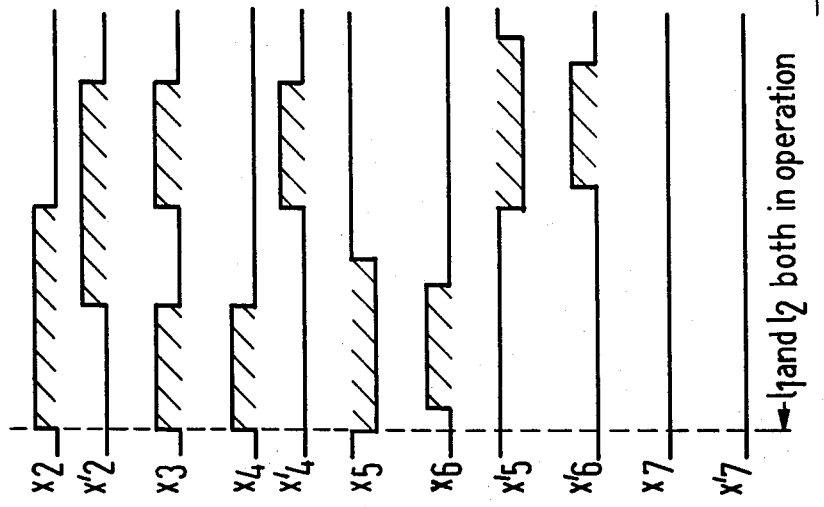

METHOD FOR THE RECOGNITION OF THE OUTAGE OF ONE OR MORE TRANSMISSION CHANNELS IN A REDUNDANTLY DESIGNED OPTICAL TRANSMISSION SYSTEM

BACKGROUND OF THE INVENTION

The present invention is directed to a method and an outage recognition circuit or device for use with a redundantly designed optical transmission system which has each subscriber station provided with at least two receiver circuits with each receiver circuit having a separate transmission channel for carrying information to the subscriber station.

In order to increase the reliability in optical transmission systems, the systems are often redundantly designed so that the information will proceed to a subscriber station on more than one channel. When the geometric paths or routes of the redundant transmission channels are different in length, problems arise because the mutually corresponding bits in the data stream arrive at the subscriber station at different times. As a result thereof, the two data streams cannot be compared to one another without further ado because of the statistical phase position in order to derive a criterion for the outage of one or more channels.

A bit-by-bit comparison of the two data streams has heretofore been achieved by means of equalization of the different optical paths by means of inserting corresponding fiber lengths or by means of a matched, electrical delay in one of the receiver circuits so that corresponding bits chronologically coincide. In both solutions, the equalization measures must be individually executed for each station. On the other hand, the solutions make a very high and critical demand on the synchronization of the data bits and on the stability of the circuits of the system.

SUMMARY OF THE INVENTION

The present invention is directed to a method and circuit or device for recognizing an outage of one or more of the transmission channels in a manner in which the synchronization with the individual adjustment is rendered unnecessary.

This object is achieved by means of a method for use with a redundantly designed optical transmission system having at least two receiver circuits at each station of the system with each receiver circuit having an output, an input and a separate transmission channel connected to an input. The method recognizes the outage of at least one of the transmission channels in the system for a given station and comprises applying data appearing at each receiver circuit of the station to a means for recognizing outages in the channel and determining an outage in the transmission channel from the occurrent data independent of the statistical phase position of the data in each channel relative to one another.

In a given practical inventive method, the occurrant or most recent data is processed in the inventive recognition device wherein the most recent data in each redundant transmission channel is stored in a memory and mutually corresponding bits of the data stored in parallel are compared to one another.

A particularly advantageous embodiment of the inventive method functions with an outage recognition device which supplies the data occurring in each of the redundant transmission channels in the form of electric signals to a logical outage recognition circuit which is uncritical with respect to transit time differences in the redundant channel and generates a signal when a transmission channel has failed, which signal not only indicates a failed channel but also identifies the failed channel.

To accomplish this preferred embodiment, the outage recognition device for the redundantly designed optical transmission system having at least two receiver circuits at each station of the system with each receiver circuit having an input, an output and a separate transmission channel connected to the input, the device or circuit determines an outage in each channel and comprises a separate first means connected to the output of each receiver circuit for creating an output signal of a first time duration or constant for the beginning data received from the receiver circuit, second means for receiving the output signal from two of the first means and creating a positive signal only when one of the output signals is being received, a pair of first AND gates with one AND gate receiving the output signal from both the second means and the first means of one channel and the other AND gate receiving the output signals of the second means and the first means of the other channel, delay means for each of the first AND gate for delaying the signal of the AND gate by a selected time duration and applying the delayed signal to a second AND gate, and third means having an input connected to the output of the first AND gate and an output connected to the second AND gate, said third means applying a zero signal to the second AND gate for a second time duration for each signal received from the first AND gate and then applying a positive signal so that the output of the second AND gates are zero when both channels are without failure and when a channel fails, the second AND gate of the other channel will have a pulse signal.

This recognition device or circuit is simply constructed and makes do with a few logic elements. For example, each of the delay means is a delay element that preferably delays the signal by the duration of one bit while both the first and third means are preferably monostable multivibrators and the second means is preferably an exclusive OR gate. A particularly advantageous feature is the fact that the recognition circuit not only recognizes the outage of one of the redundant paths but also identifies which path has failed.

The transit time difference for the data transmitted in the redundant transmission channel is selected to be at least equal the transit time of the data in the longest transmission length of the transmission system. For technical reasons, the prescribable time difference such as the second time duration or constant $\tau_4$ and the first time duration or constant $\tau_2$ should be selected relative to one another with the time constant $\tau_4$ being selected greater than the transit time difference by at least the chronological length of one bit and the first time constant $\tau_2$ being selected greater than the second time constant $\tau_4$ by at least the chronological length of one bit.

BRIEF DESCRIPTION OF THE DRAWINGS

FIG. 1 is a diagrammatic illustration of a simple, redundant optical transmission system with three subscriber stations;

FIG. 2 is a block diagram of an outage recognition circuit or device according to the present invention; and FIGS. 3a–3c show various pulse diagrams for a length of time t to illustrate the various pulse signals from various circuit elements of the recognition circuit of FIG. 2 wherein FIG. 3a shows an instant wherein neither of the two redundant transmission channels has failed, FIG. 3b shows an instant where one channel has failed and FIG. 3c shows where the other channel has failed.

DESCRIPTION OF THE PREFERRED EMBODIMENTS

The principles of the present invention are particularly useful when incorporated in a singularly redundant transmission system generally indicated at TS in FIG. 1. The system TS, as illustrated, includes three subscriber stations $T_I$, $T_{II}$ and $T_{III}$. Each of the subscriber stations has a transmitter S and a receiver E so that the three stations $T_I$, $T_{II}$ and $T_{III}$ include transmitters $S_I$, $S_{II}$ and $S_{III}$ and receivers $E_I$, $E_{II}$ and $E_{III}$. Each of the transmitters T provides as output via two information paths or channels and each of these information paths or channels proceed to receivers. The power can also be reduced on the transmission paths, for example, by passing through star couplers such as SK1 and SK2.

For example, the transmitter $S_I$ of the subscriber station $T_I$ transmits data to a receiver $E_{III}$ over the transmission paths $l_1$ and $l_2$. When both of the paths $l_1$ and $l_2$ which may consist, for example, of optical fibers, are connected to a common detector in a receiver $E_{III}$, the transit time difference of the two data streams must be compensated, for example, by means of inserting corresponding additional fibers into the shorter of the two transmission paths. This means very critical demands for synchronization. An outage of one of the channels could be identified by two threshold comparators wherein the threshold of the one comparator responds when only one bit stream is present but both comparators respond when both bit streams are superimposed in the proper phase. The two bit streams could also be captured via a respective detector with the following receiver part and undertake a corresponding, electrical delay for a bit-by-bit comparison. This method, however, is likewise very critical and susceptible to disruptions.

These problems are eliminated where the occurrent data are supplied to an outage recognition means which identifies the outage of a transmission channel from the data that has occurred independently of their statistical phase positions relative to one another. As illustrated in FIG. 2, each of the receivers $E_{III}$ has two receiver sections or circuits e1 and e2. One can therefore perceive in such a manner that the data appearing at the output of both receiver sections e1 and e2 at different times are brought into a memory. Then, after waiting a sufficiently long time so that an adequate number of bits have entered into both memories, one can determine whether a channel is malfunctioning or not by means of comparing the mutually corresponding bits in both memories. In order to make it impossible for transmission errors to simulate a channel outage, a very low frequency of occurrence wherein the corresponding bits do not coincide, a given transmission error must be employed as a criterion. Which transmission channel is down cannot, however, be identified with this method. Suitable for this purpose is a method wherein the occurrent or most recent data is supplied to a logical outage recognition circuit in the form of electrical signals, this circuit is uncritical with respect to the transit time differences in the redundant channel and generates a signal when the transmission channel has failed. Critical delays are likewise not required given this method. The length of the data stream and the phase position of both data streams are arbitrary and the logical outage recognition circuit indicates in a simple and uncritical manner whether a transmission channel has dropped out. It even indicates which transmission channel has been interrupted or failed.

This logic outage recognition circuit or device is illustrated at ORC in FIG. 2. The two receiver circuits or sections e1 and e2 of the station receiver $E_{III}$ have the two transmission channels $l_1$ and $l_2$ and are located on the left of a dotted vertical line A. The most recent or reacquired data is taken out of the outputs of these receiver circuits e1 and e2. It is noted that the receiver circuits e1 and e2 each include an optical electronic transducer and a comparator. Thus, the output from each of these receiver circuits e1 and e2 will be an electrical signal in the form of electrical pulses.

The outage recognition circuit ORC is illustrated by the components on the right-hand side of the broken line A. This circuit ORC comprises two monostable multivibrators M11 and M12. Each have a first time constant or first time duration $\tau_2$. The multivibrators M11 and M12 form the first means for creating an output signal of the first time constant or duration for the start of each group of bits of data received from the receiver. The data stream from the receiver circuit e1 is supplied to the first multivibrator M11 and the data stream from the second receiver circuit e2 is supplied to the other first multivibrator M12. Both of these data streams are in the form of electrical signals or pulses. Each of the two multivibrators can be initiated by means of a leading edge in the supplied signal. The relative phase position of the two output signals x2 and x'2 of the two first multivibrators M11 and M12 correspond precisely to the relative phase position of the supplied signals relative to one another.

The output x2 of the multivibrator M11 as well as the output signal x'2 of the multivibrator M12 are plotted as the top two lines, respectively, in FIGS. 3a, 3b and 3c and are applied to the input side of an exclusive OR gate EXOR. The exclusive OR gate EXOR has an output signal x3 which is shown in the third line from the top in FIGS. 3a through 3c and will be positive only when it receives a positive signal from only one of the two first multivibrators and thus form the second means. The output signal x3 for the exclusive OR gate EXOR is applied to one of the inputs of an AND gate U11 for the one channel e1 and also to the AND gate U12 for the other channel e2. The AND gate U11 also receives the signal x2 from the multivibrator M11 and when there is a signal or positive pulse for both the signals x2 and x3, produces the signal x4. In a similar manner, the AND gate U12 receives the signal x'2 of the multivibrator M12 and signal x3 and will produce a positive signal x'4 when two positive pulses are received for the signals x3 and x'2. In the graphical presentations of FIG. 3, the signals x4 and x'4 are illustrated by the fourth and fifth lines from the top, respectively.

The output signal x4 of the AND gate U11 is applied to an input side of a third means for creating a positive signal which is preferably a second leading edge controlled monostable multivibrator M21 which has a second time constant $\tau_4$. As illustrated, the output of this multivibrator is selected so that an inverted output signal x5 is produced and applied to one side of the input of a second AND gate U21. The signal x4 is also passed through means for delaying the signal for a given length of time which is illustrated as a one bit delay element D1 which has an output x6 applied to the other input of the AND gate U21. In a similar manner, the output signal x'4 is applied to corresponding third means which is another leading edge controlled monostable multivibrator M22 having a second time constant $\tau_4$ with an output x'5 connected to one of the inputs of an AND gate U22. Also, the output signal x'4 passes through a one bit delay D2 to produce the signal x'6 which is applied to the other input of the AND gate U22. The AND gate U21 has an output x7 while the AND gate U22 has an output x'7. The outputs x5 and x6 are lines 6 and 7 while the outputs x'5 and x'6 are lines 8 and 9 in FIGS. 3a–3c. The outputs x7 and x'7 are the bottom two lines of each of the Figures.

FIG. 3a illustrates the various pulses which are attained when both the lines or channels $l_1$ and $l_2$ are in operation and have not failed. As seen from FIG. 3a, the pulse illustration for x'2 shows a time delay over the output signal x2. Due to this delay, the signal x3 from the exclusive OR gate EXOR has two pulses and causes the AND gate U11 to produce a single pulse x4 and the AND gate U12 to produce a singlepulse signal x'4. Since the monostable multivibrator M21 produces a negative pulse or zero pulse signal at the leading edge as illustrated by x5 and the delay means D1 produces a pulse illustrated x6, the output of the AND gate U21 will be zero as illustrated by the line x7. In a similar manner, the output of the AND gate U22 is also zero. The zero output is true both for when data signals are adjacent to the inputs of the first multivibrators M11 and M12 as well as when no data signals are applied. This is identified by the continuous zero sequence.

However, when the signal x7 is a +1 pulse as illustrated in FIG. 3b or when the signal of the AND gate U22, x'7 is a +1 pulse as illustrated in FIG. 3c, this indicates that the other channel or transmission path is inoperative, interrupted or has failed. In particular, when a pulse is provided on the signal x7, that indicates that the path $l_2$ is out whereas a positive one pulse in the output x'7 indicates that the path or channel $l_1$ is out. It should be noted that the delay times due to the individual elements has not been taken into consideration in the pulse diagrams of FIGS. 3a and 3c. Basically, it should also be noted that what happens when one of the channels is out such as the channel $l_2$ is that the relationship of the pulse train x5 going from a negative or zero to a +1 occurs while there is a plus pulse on the line x6 to create the one pulse indication on the AND gate U21 (see line x7). In a similar manner, the relation of the pulses x'5 and x'6 creates a +1 pulse on the output x'7 of the AND gate U22.

The transit time differences between the transmission channel or path $l_2$ and $l_1$ is given by the formula $$t_2 - t_1 = (W_2 - w_1) n/c$$

wherein n is the refractive index of the fibers $l_1$ and $l_2$, c denotes the velocity of light in a vacuum and $w_1$ and $w_2$ respectively denote the length of the particular transmission paths $l_1$ and $l_2$, respectively. The time duration or constant $\tau_4$ of the second multivibrators M21 and M22 is selected to be greater than $t_2-t_1$ and the time constant $\tau_2$ of the first multivibrators M11 and M12 is selected to be greater than $\tau_4$. When it is specifically assumed that $w_2$ is greater than $w_1$, then the maximum transit time difference $(\Delta t)_{max}$ is derived at $$(\Delta t)_{max} = (t_2)_{max} = n \cdot (w_2)_{max}/c,$$

wherein $(w_2)_{max}$ is the greatest distance between any transmitter and receiver in the system.

The circuit of FIG. 2 functions independently of the path differential between $w_2$ and $w_1$ and is independent of the length of the data stream when the following conditions are observed:

$$n \cdot (w_2)_{max}/c < \tau_4 < \tau_2.$$

The time difference $n \cdot (w_2)_{max}/c$ and $\tau_4$ or, respectively, $\tau_4$ and $\tau_2$ should not fall below the duration of a bit for technical reasons. The two second multivibrators M21 and M22 respectively can have mutually different time constants $\tau_4$. Each of these time constants must then fulfill the last-mentioned condition.

Although various minor modifications may be suggested by those versed in the art, it should be understood that I wish to embody within the scope of the patent granted hereon, all such modifications as reasonably and properly come within the scope of my contribution to the art.

I claim:

1. An outage recognition device for a redundantly designed optical transmission system having at least two receiver circuits at each station of the system and each receiver circuit having an input and an output with the input being connected to a separate transmission channel, said device determining an outage in each channel and comprising a separate first means connected through the output of each receiver circuit of the receiver circuits for creating an output signal for a first time constant for each bit of data received from the receiver circuit, second means for receiving the output signals from two of the first means and creating a positive signal only when one of the output signals is being received, a pair of first AND gates with one AND gate receiving the output signals from both the second means and the first means of one channel and the other AND gate receiving the output signals of both the second means and the first means of the other channel, each of the first AND gates having its output connected to both a separate third means and to a separate delay means, the delay means for each of the first AND gates delaying the signal of the AND gate by a specific time duration and applying it to one of a pair of second AND gates and the third means for the same first AND gate having an output connected to the same second AND gate, said third means creating a zero signal for a second time constant for each signal received from the first AND gate and then applying a positive signal so that the output of the second AND gates are zero when both channels are without failure and when a channel fails, the second AND gate of the other channel will have a pulse signal.

2. An outage recognition device according to claim 1, wherein the transit time difference is selected at least equal to the transit time of the data in the longest transmission length of the transmission system.

3. An outage recognition device according to claim 2, wherein the second time constant is selected to be greater than the transit time difference by at least a chronlogical length of one bit and the first time constant is selected to be greater than the second time constant by at least the chronological length of one bit.

4. An outage recognition device according to claim 1, wherein each of the first means is a monostable multivibrator, wherein the second means is an exclusive OR gate, and wherein the third means are monostable multivibrators.

5. An outage recognition device according to claim 4, wherein the transit time difference is selected at least equal to the transit time of the data in the longest transmission length of the transmission system.

6. An outage recognition device according to claim 5, wherein the second time constant is selected to be greater than the transit time difference by at least the chronological length of one bit and the first time constant is selected to be greater than the second time constant by at least the chronological length of one bit.

7. An outage recognition device according to claim 4, wherein the specific time duration for the delay means is one bit.

8. An outage recognition device according to claim 7, wherein a transit time difference is selected to be at least equal to the transit time of the data in the longest transmission length of the transmission system and wherein the second time constant is selected to be greater than the transit time difference by at least a chronological length of one bit and the first time constant is selected to be greater than the second time constant by at least the chronological length of one bit.

* * * * *